(12) United States Patent
Liu

(10) Patent No.: US 6,575,648 B1
(45) Date of Patent: Jun. 10, 2003

(54) INDEX BAR DEVICE INCLUDING KEYSTROKE FUNCTION

(75) Inventor: Chia-Hung Liu, Taipei (TW)

(73) Assignee: Darfon Electronics Corp., Tao Yuan (TW)

( * ) Notice: Subject to any disclaimer, the term of this patent is extended or adjusted under 35 U.S.C. 154(b) by 215 days.

(21) Appl. No.: 09/598,264

(22) Filed: Jun. 21, 2000

(30) Foreign Application Priority Data

Jun. 25, 1999 (TW) .................................... 88210497 U

(51) Int. Cl.[7] .............................. B41J 5/12; G01L 1/22; G06F 3/33
(52) U.S. Cl. .................. 400/490; 400/495.1; 345/157; 345/158
(58) Field of Search .......................... 400/490, 491.2, 400/491.3, 495, 495.1, 496; 200/520, 530, 534; 345/157, 158, 159, 160, 161, 162

(56) References Cited

U.S. PATENT DOCUMENTS

| | | | | |
|---|---|---|---|---|
| 4,234,871 A | * | 11/1980 | Guglielmi et al. | ............ 341/33 |
| 4,584,444 A | * | 4/1986 | Nagashima | ............... 200/276.1 |
| 4,800,245 A | * | 1/1989 | Murmann et al. | ........... 200/286 |
| 5,836,442 A | * | 11/1998 | Hirano | ........................ 200/284 |
| 6,293,160 B1 | * | 9/2001 | Shigemoto | ............. 73/862.632 |

FOREIGN PATENT DOCUMENTS

DE          4209668 A1  *  9/1993   ............ G05G/9/08

* cited by examiner

Primary Examiner—Daniel J. Colilla
(74) Attorney, Agent, or Firm—Troxell Law Office PLLC

(57) ABSTRACT

An index bar device including keystroke-function constitutes a base, a track frame mounted on the base having a track space formed therein, an index bar sliding means having a slide block held and reciprocally movable in the track space and an index bar having one end extending outside the track frame, and an elastic switch means located between the index bar sliding means and the base. When an external force applying on the end of the index bar, the index bar sliding means will be moved in the track space to compress the elastic switch means to move a selected displacement and generate a switch signal which may be output for a circuit to perform function desired.

15 Claims, 7 Drawing Sheets

INDEX BAR DEVICE INCLUDING KEYSTROKE FUNCTION

FIELD OF THE INVENTION

This invention relates to an index bar device which includes keystroke function and particularly to an index bar device that couples with a sliding means and an elastic means to perform keystroke function.

BACKGROUND OF THE INVENTION

Index input devices are widely used in various type of computer input devices such as control panel, keyboard, remote control device and the like. The embodiment of the index input device may be in the form of mouse, joystick, touch pad, track ball, pointing stick and the like. The basic principle of the index input device application is to generate analog signal base on strain resulting from force applying on the index device at a selected direction. The analog signal output is used by computer for performing required function. FIG. 1 shows a typical example. An index bar means 3 is located between keys of a keyboard 2 in a notebook computer for sensing the strain resulting from user's force applying direction and generating signals for computer cursor movement.

However conventional index bar devices mostly focus their function on cursors movement. They cannot perform other function on cursor movement. They cannot perform other function such as the left key (for selection) of the mouse with satisfactory result. When performing the selection function on the index bar, a user normally has to hit the top end of the index bar twice to simulate the keystrokes on the left key of the mouse. Because of index bar device structure nature, hitting the index bar on the top usually has the feeling of hitting on a hard surface. It does not have the "clicking" feeling and sound the keystroke on the left key of the muse produced. It is less user-friendly and begs for improvement.

SUMMARY OF THE INVENTION

It is therefore an object of this invention to provide an improved index bar device that includes keystroke function so that user may use more conveniently and comfortably.

The index bar device according to this invention include a sliding means and an elastic means to provide keystroke function like the left key of the mouse. It may be used in a computer. It constitutes a base, a track frame, an index bar sliding means and an elastic switch means.

The base may be a base board of an input device such as the keyboard, mouse and the like or a separate board to be used in a computer.

The track frame is mounted on the base to provide a track space for reciprocal movement.

The index bar sliding means is movable in the track frame and includes a slide block and an index bar. The slide block is movable in the track space and has a hole formed therein. The index bar is fixedly engaged with the hole and has a first end extending outside the track frame and a second end located in the hole or extending outside the bottom of the slide block.

The elastic switch means is fixedly located on the bas and makes contact with a bottom of the index bar sliding means. It can generate a restoring spring force when being compressed by the index bar sliding means.

According to this invention, when the index bar receives force from the first end toward the second end, the index bar sliding means moves along the track frame and compresses the elastic switch means for a selected displacement. This compressing movement may generate a keystroke signal through a properly designed circuit.

In one embodiment of this invention, the track frame may be a hollow casing including a top opening. The index bar sliding means is movable within the boundary of the hollow space and the first end of the index bar runs through the top opening.

In another embodiment of this invention, the track frame may be a turtledove tail-shaped groove and the index bar sliding mean is a mating turtledove tail-shaped block movable in the track frame. Or the track frame may be a turtledove tail-shaped block while the index bar sliding means has mating tail-shaped groove.

In yet another embodiment, the track frame may be a thick board with a top opening. The index bar sliding means may be movable and limited in the top opening.

The elastic switch means may be a compression spring with the top end serving as the compression contact point, or a dish type elastic member having a bulged middle section to serve as the compression contact point, or a cantilever type member with a free end to serve as the compression contact point.

The index bar and the index bar sliding means are tightly engaged through a hole in the index bar sliding means. The engagement may be a forced sliding means. The engagement may be a forced coupling, adhering and the like. However it's preferably done by theremo setting.

The compression contact between the elastic switch means and the index bar sliding means may be the second end of the index bar or the bottom end of the slide block.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

In the following description, components of same function will be marked by same names and numerals even if they are physically different in various embodiments.

Figure 1:
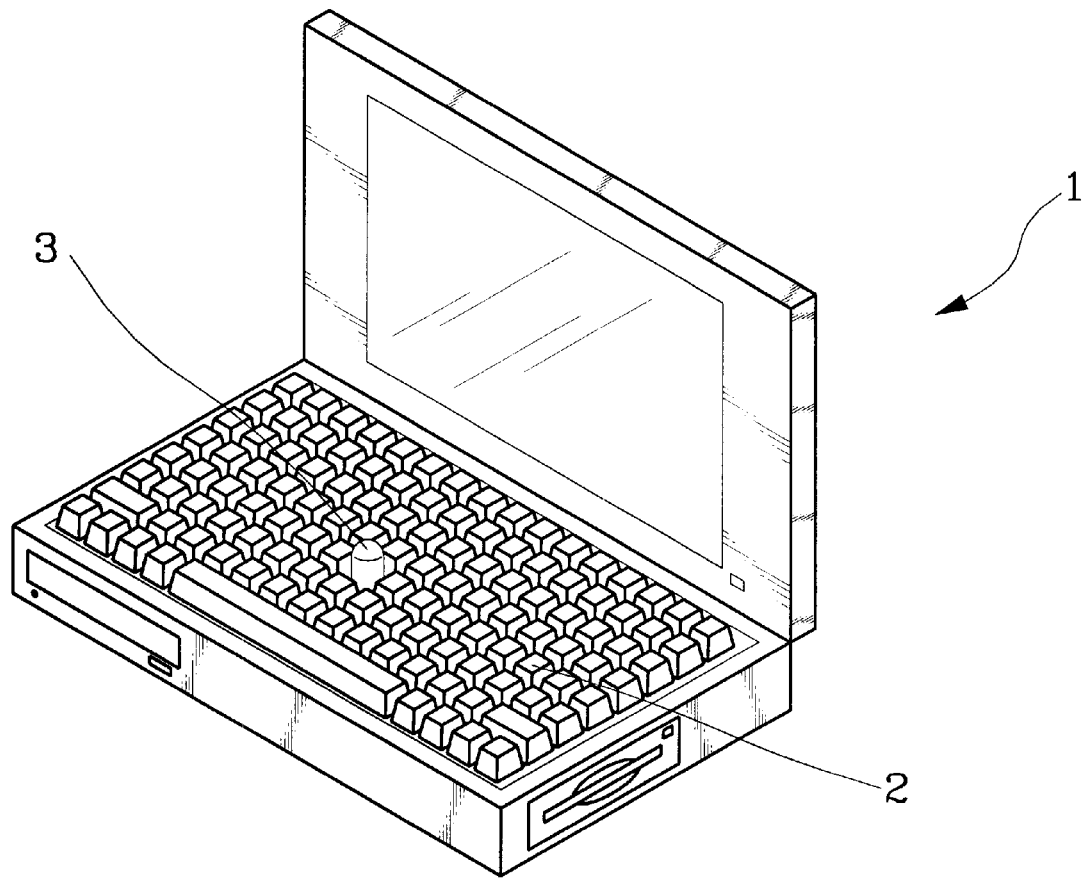
FIG. 1 is a pictorial view of an index bar used in a notebook computer.
Figure 2:
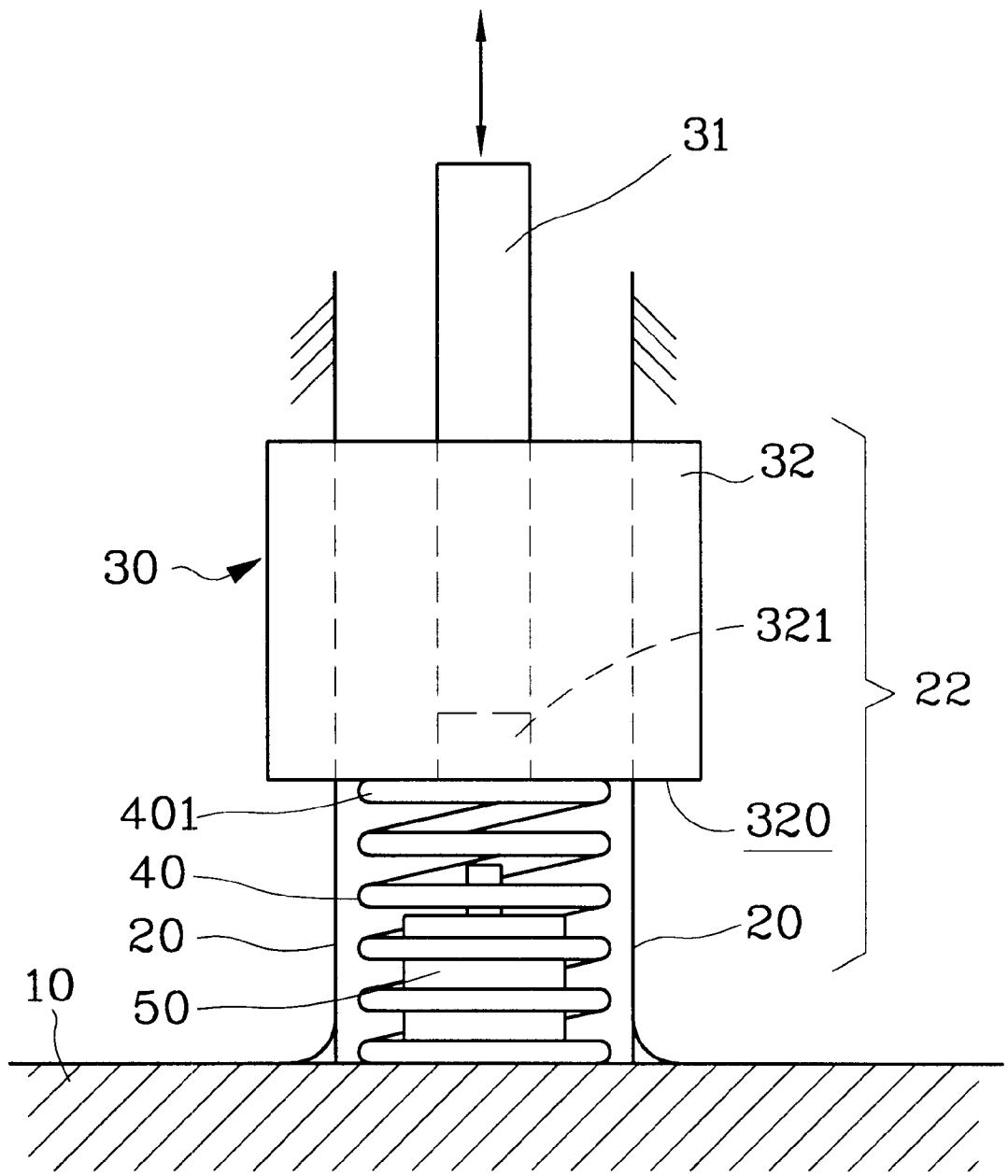
FIG. 2 is a schematic side view of this invention.

Referring to FIG. 2, the basic structure of this invention includes a base 10, a track frame 20 mounted on the base 10, an index bar sliding means 30 slidable in the track frame 20 and an elastic switch means 40 located between the base 10 and the index bar sliding means 30.

The base 10 may be a base board in a computer input device (such as keyboard, mouse and the like) or a separate board. The track frame provides a reciprocal movement space for the index bar sliding means 30 which may include a slide block 32 and an index bar 31 engaged with the slide block 32. The index bar 31 may be a conventional index bar having a plurality of strain gauges (not shown in the figure) located thereon and circuits (also not shown in the figure) writing with the strain gauges for strain signal transmission. The slide block 32 is movable in a track space 22 formed in the track frame 20. The index bar 31 is tightly engaged with a hole 321 formed in the slide block 32 by means of theremo setting forced coupling, adhering and the like.

The elastic switch means 40 is located on the base 10 and has a contact point 401 at one end making contact with a bottom end 320 of the index bar sliding means 30. The elastic switch means 40 supports the index bar sliding means and offers restoring spring force when compressed by the index bar sliding means 30. It may be a spring, spring dish, spring cantilever and the like.

Through a circuit located in the elastic switch means 40 or a microswitch means 50 adjacent the elastic switch means, when the index bar sliding means 30 moves toward and compresses the elastic switch means 40, a keystroke signal will be generated for computer use. Hence this invention provides both function of the index bar and left key of the mouse.

Figure 3:
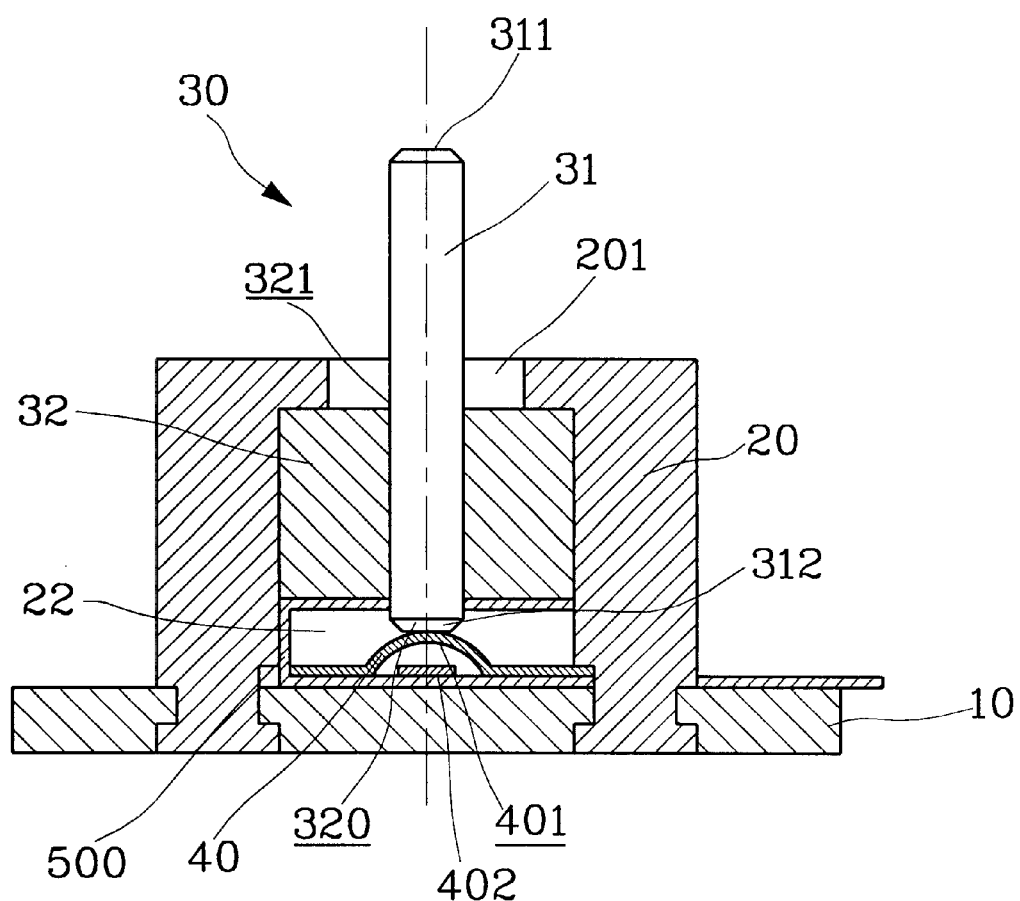
FIG. 3 is a sectional view of a first embodiment of this invention.

FIG. 3 shows the first embodiment of this invention. The track frame 20 is formed like a casing with a hollow track space 22 inside and a top opening 201. The side block 32 is held and movable in the track space 22 and has a hole 321 formed therein. There is an index bar 31 fixedly engaged with the hole 321 and having a first end 311 extending outside the track frame 20 through the top opening 201 and a second end 312 aligning with or extending out of the bottom surface of the slide block 32 through the hole 321.

The elastic switch means 40 may be an electrode made of a resilient dish spring with a bulged center contact point 401. The circuit of the switch may be included in the electrode 402 located in the dish spring above the base 10. The elastic switch means 40, electrode 402 and the index bar sliding means 30 may wire with an annular conductive wire 500 to form a complete switch circuit. The structure of the conductive wire 500 and the switch circuit is known in the art and forms no part of this invention, thus will be omitted herein.

When in use, a force is applied on the first end 311 toward the second end 312. The index bar sliding means 30 will be downward along the track frame 20 to press the elastic switch means 40 downward for a selected displacement. The elastic switch means 40 will make contact with the electrode 402 to generate a signal output through the conductive wire 500.

Figure 4:
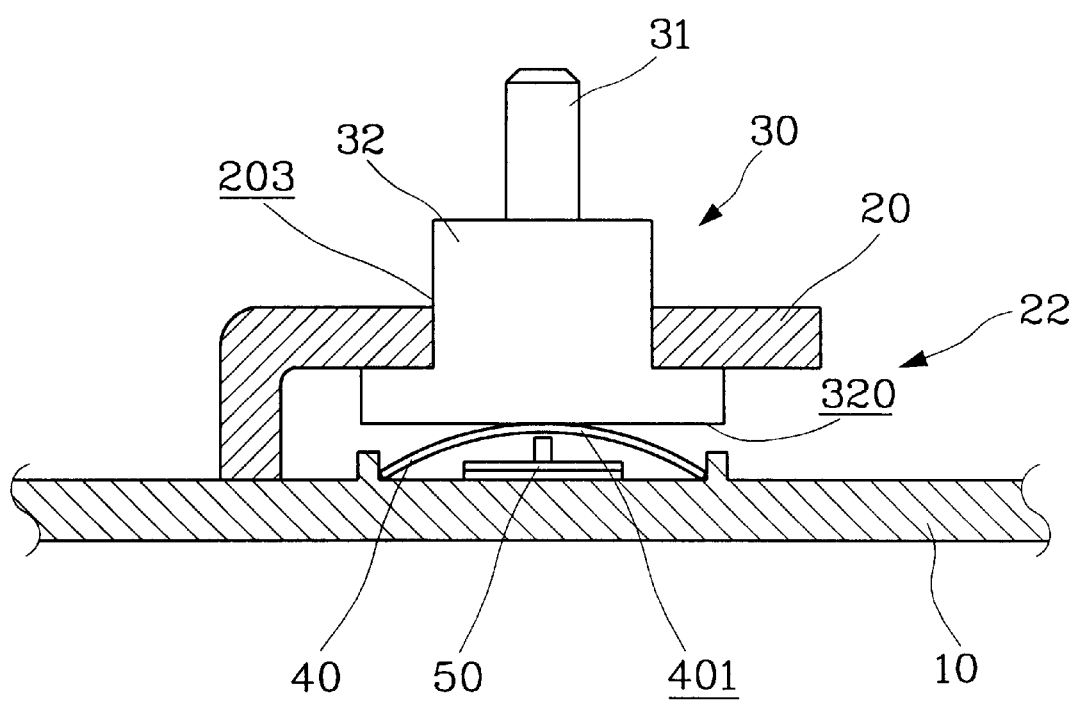
FIG. 4 is a sectional view of a second embodiment of this invention.

FIG. 4 shows the second embodiment of this invention. The track frame 22 is a thick board having a horizontal flange with a top opening 203 formed therein and a vertical flange engage with the base 10. The slide block 32 of the index bar sliding means 30 is held and movable in the top opening 203. The elastic switch means 40 in the top opening 203. The elastic switch means 40 is a dish type spring switch. There is a micro circuit 50 located below the elastic switch means 40.

Figure 5:
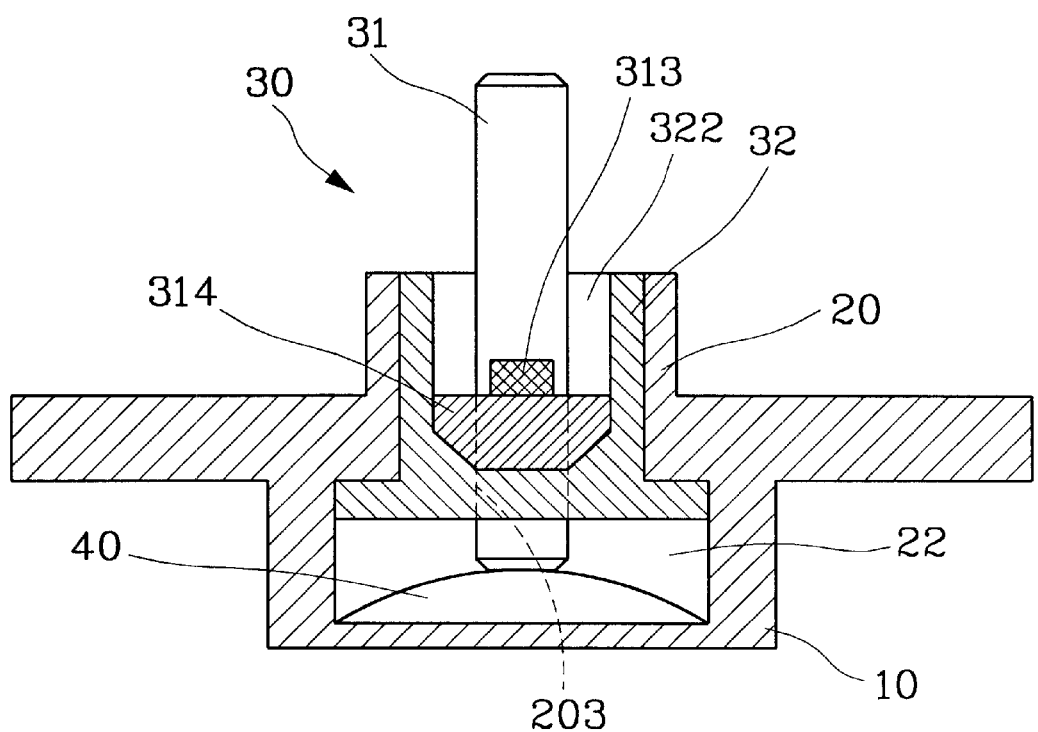
FIG. 5 is a sectional view of a third embodiment of this invention.

FIG. 5 shows the third embodiment of this invention. The track frame 20 and the base 10 are integrally formed and have a track space 22 in side and a top opening 203 in the middle. The slide block 32 is held and movable in the top opening 203. In the slide block 32, there is a relative large cavity 322. The index bar 31 may engage with the slide block 32 in the cavity 322 by means of a thermo setting adhesive 314. A strain gauge 313 is mounted in the index bar 31. The elastic switch means 40 may be a dish type spring switch shown in FIG. 3 or 4. A micro circuit like the one used in the embodiment 1 or 2 may also be included (not shown in the figure).

Figure 6:
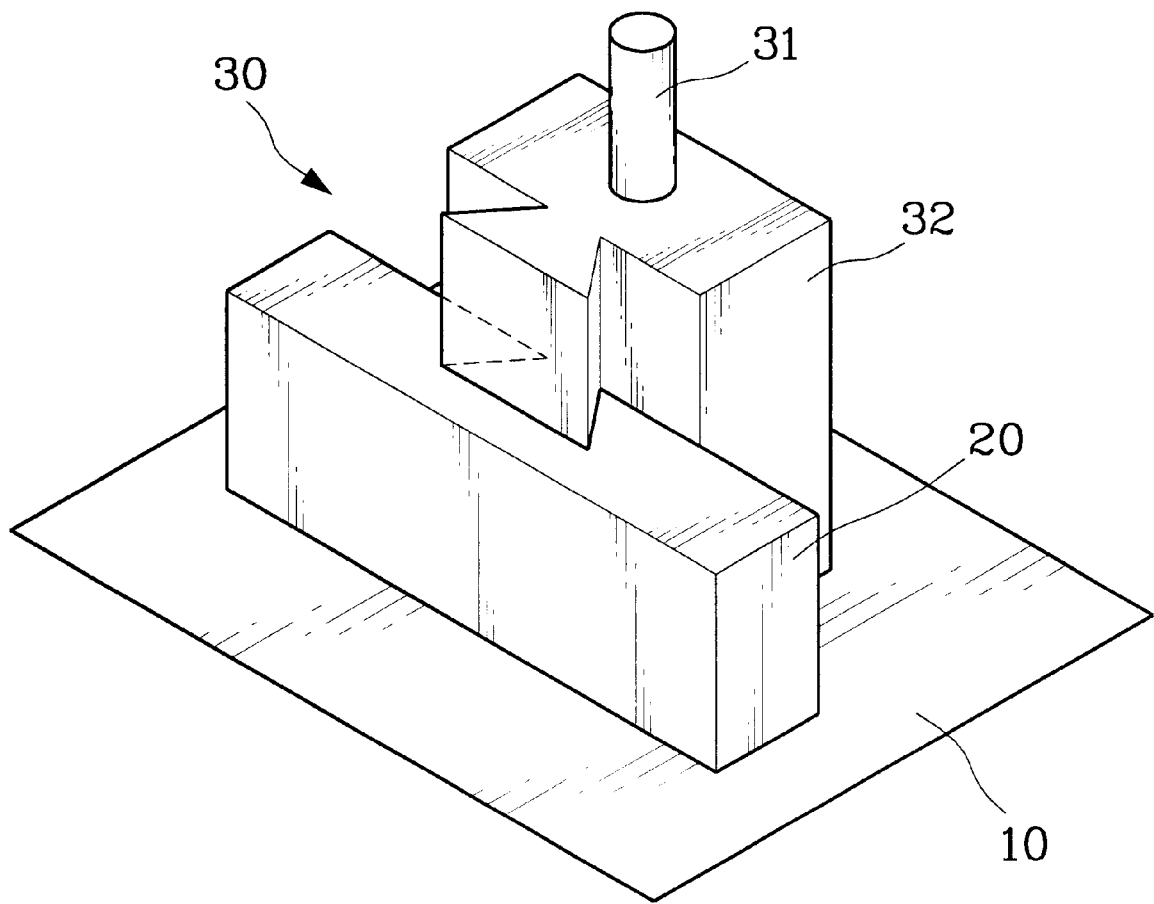
FIG. 6 is a sectional view of a fourth embodiment of this invention.

FIG. 6 shows the fourth embodiment of this invention. The track frame 20 has a turtledove tail-shaped groove. The slide block 32 has a turtledove tail-shaped lug mating and movable in the groove. One or more elastic switch means like the one shown in FIG. 3 or 4 may be located on the base 10 under the slide block 32 (not shown in the figure). Of course same type of micro circuit used in aforesaid embodiments may also be included.

Figure 7:
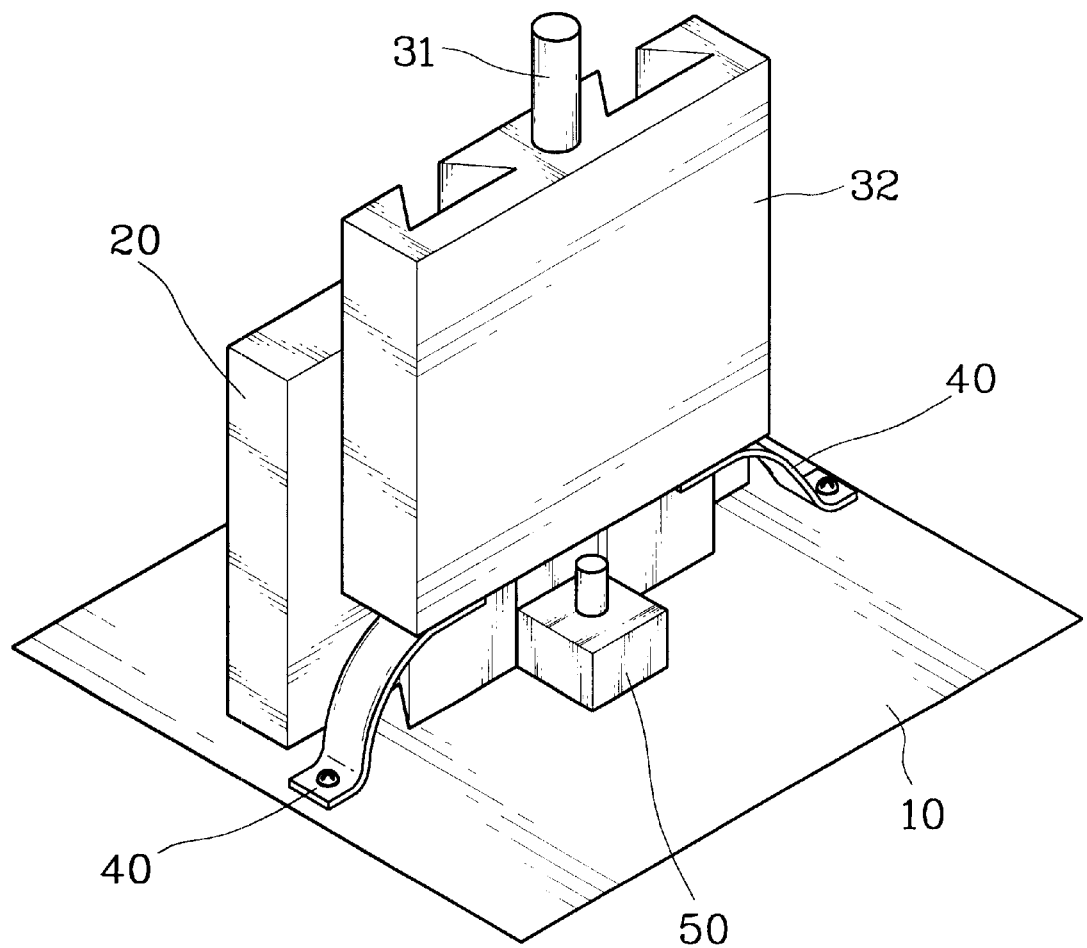
FIG. 7 is a sectional view of a fifth embodiment of this invention.

FIG. 7 illustrates the fifth embodiment which is largely like the one shown in FIG. 6. However there are two turtledove tail-shaped grooves formed in the slide block while the mating turtledove tail-shaped lugs are located on the track frame 20. The elastic switch means 40 constitutes two cantilever type strip springs. A micro circuit 50 is located between the two strip springs.

The track frame 20 may be a separate member mounted on the base 10, or may be integrally formed with the base 10 such as the embodiment third and fourth which is being formed directly from a computer keyboard casing, or embodiment second which is being formed from the keyboard casing.

In this invention, the motion of the index bar sliding means 30 is guided and restricted by the track frame 20 and may be actuated by the spring force of the elastic switch means 40. The impact of gravitational force is minimum. Therefore the motion direction may be vertical, horizontal or included at an angle.

The application and structure of the strain gauge on the index bar 31 and the associated circuit, and the circuitry for the micro circuit are known in the art, and thus will be omitted herein.

Through the structure set forth above, the index bar device according to this invention may provide both index bar and keystroke function, and may be flexibly installed at any angle desired in a computer system.

It may thus be seen that the objects-of the present invention set forth herein, as well as those made apparent from the foregoing description, are efficiently attained. While the preferred embodiment of the invention have been set forth for purpose of disclosure, modifications of the disclosed embodiment of the invention as well as other embodiments thereof may occur to those skilled in the art. Accordingly, the appended claims are intended to cover all embodiments which do not-depart from the spirit and scope of the invention.

What is claimed is:

1. An index bar device including key structure function for a computer, comprising:
 a base;
 a track frame located above the base having a track space; and
 an index bar sliding device, said index bar sliding device including:
  a slide block reciprocally movable in the track space having a hole formed therein,
  an index bar fixedly engaged with the hole having a first end extending above the track frame and a second end, and
  an elastic switch located between a bottom of the index bar sliding device and the base;

wherein the index bar sliding device has a bottom end pressing and moving the elastic switch for a selected displacement when an external force is applied on the first end toward the second end for the elastic switch to generate a keystroke signal output;

wherein the track frame has a turtledove tail-shaped groove and slide block has a turtledove tail-shaped lug slidably engaged with the groove.

2. An index bar device including key structure function for a computer, comprising:
- a base;
- a track frame located above the base having a track space; and
- an index bar sliding device, said index bar sliding device including:
  - a slide block reciprocally movable in the track space having a hole formed therein,
  - an index bar fixedly engaged with the hole having a first end extending above the track frame and a second end; and
  - an elastic switch located between a bottom of the index bar sliding device and the base;
- wherein the index bar sliding device has a bottom end pressing and moving the elastic switch for a selected displacement when an external force is applied on the first end toward the second end for the elastic switch to generate a keystroke signal output;
- wherein the track frame has a turtledove tail-shaped lug and the slide block has a turtledove tail-shaped groove slidably engaged with the lug.

3. An index bar device including key structure function for a computer, comprising:
- a base;
- a track frame located above the base having a track space; and
- an index bar sliding device, said index bar sliding device further including:
  - a slide block reciprocally movable in the track space having a hole formed therein,
  - an elongated index bar fixedly engaged with the hole having a first end extending above the track frame and a second end,
  - at least one strain gauge mounted in the index bar, and
  - an elastic switch located between a bottom of the index bar sliding device and the base;
- wherein a strain gauge signal output is generated from said strain gauge when a first external force is applied on the first end of said index bar in a direction perpendicular to the elongate direction of the index bar;
- wherein the index bar sliding device has a bottom end pressing and moving the elastic switch for a selected displacement when a second external force is applied on the first end toward the second end for the elastic switch to generate a keystroke signal output; and
- wherein the track frame has a turtledove tail-shaped groove and the slide block has a turtledove tail-shaped lug slidably engaged with the groove.

4. The index bar device of claim 3, wherein the track frame is a casing having a hollow space inside to serve as the track space and a top opening for the first end of the index bar passing through so that the index bar sliding device is held and is movable in the hollow space.

5. The index bar device of claim 3, wherein the elastic switch is a compression spring having a compression contact point located at a top end thereof.

6. The index bar device of claim 3, wherein the elastic switch is a dish-shaped elastic device having a bulged middle section to serve as a compression contact point.

7. The index bar device of claim 3, wherein the elastic switch is a cantilever having a free end to serve as a compression contact point.

8. The index bar device of claim 3, wherein the bottom end of the entire index sliding device which is used to press and move the elastic switch is the second end of the index bar.

9. The index bar device of claim 3, wherein the bottom end of the entire index bar sliding device which is used to press and move the elastic switch is a bottom end of the slide block.

10. An index bar device including key structure function for a computer, comprising:
- a base;
- a track frame located above the base having a track space; and
- an index bar sliding device, said index bar sliding device further including:
  - a slide block reciprocally movable in the track space having a hole formed therein,
  - an elongated index bar fixedly engaged with the hole having a first end extending above the track frame and a second end,
  - at least one strain gauge mounted in the index bar, and
  - an elastic switch located between a bottom of the index bar sliding device and the base;
- wherein a strain gauge signal output is generated from said strain gauge when a first external force is applied on the first end of said index bar in a direction perpendicular to the elongate direction of the index bar;
- wherein the index bar sliding device has a bottom end pressing and moving the elastic switch for a selected displacement when a second external force is applied on the first end toward the second end for the elastic switch to generate a keystroke signal output; and
- wherein the track frame has a turtledove tail-shaped lug and the slide block has a turtledove tail-shaped groove slidably engaged with the lug.

11. The index bar device of claim 10, wherein the elastic switch is a compression spring having a compression contact point located at a top end thereof.

12. The index bar device of claim 10, wherein the elastic switch is a dish-shaped elastic device having a bulged middle section to serve as a compression contact point.

13. The index bar device of claim 10, wherein the elastic switch is a cantilever having a free end to serve as a compression contact point.

14. The index bar device of claim 10, wherein the bottom end of the entire index sliding device which is used to press and move the elastic switch is the second end of the index bar.

15. The index bar device of claim 10, wherein the bottom end of the entire index bar sliding device which is used to press and move the elastic switch is a bottom end of the slide block.

* * * * *